(12) United States Patent
Saxen et al.

(10) Patent No.: US 8,628,848 B2
(45) Date of Patent: Jan. 14, 2014

(54) PLASTIC FILMIC LABEL AND A USE OF A PLASTIC FILM FOR A FILMIC LABEL

(75) Inventors: Håkan Saxen, Nokia (FI); Martti Vähälä, Tampere (FI); Tom Saxberg, Tampere (FI)

(73) Assignee: UPM Raflatac Oy, Tampere (FI)

( * ) Notice: Subject to any disclaimer, the term of this patent is extended or adjusted under 35 U.S.C. 154(b) by 829 days.

(21) Appl. No.: 12/602,594

(22) PCT Filed: Jun. 2, 2008

(86) PCT No.: PCT/FI2008/050316
§ 371 (c)(1),
(2), (4) Date: Jun. 4, 2010

(87) PCT Pub. No.: WO2008/145826
PCT Pub. Date: Dec. 4, 2008

(65) Prior Publication Data
US 2010/0242326 A1    Sep. 30, 2010

(30) Foreign Application Priority Data
Jun. 1, 2007    (FI) .................................. 20075401

(51) Int. Cl.
*B32B 5/18*    (2006.01)
*B32B 7/12*    (2006.01)
*B29C 44/24*    (2006.01)
*B29C 47/06*    (2006.01)
*B32B 5/14*    (2006.01)

(52) U.S. Cl.
USPC ............... 428/354; 428/314.2; 428/314.8; 428/317.9; 428/318.4; 428/319.7; 428/319.9; 428/343; 40/638; 264/45.3; 264/45.9; 264/50; 264/210.2; 264/210.7; 264/211.12; 264/211.13

(58) Field of Classification Search
None
See application file for complete search history.

(56) References Cited

U.S. PATENT DOCUMENTS 4,104,816 A * 8/1978 Pingeton .................. 40/638
4,720,416 A * 1/1988 Duncan ................ 428/195.1
(Continued)

FOREIGN PATENT DOCUMENTS

| EP | 1093906 A2 | 4/2001 |
|---|---|---|
| FI | 107035 B | 5/2001 |
| WO | WO-96/06718 A1 | 3/1996 |

OTHER PUBLICATIONS

Polymer Crystallinity (no date).*

(Continued)

*Primary Examiner* — David Sample
*Assistant Examiner* — Jeff Vonch
(74) *Attorney, Agent, or Firm* — Venable LLP; Eric J. Franklin

(57) ABSTRACT

A filmic label including a face material having a front side, a reverse side and an adhesive layer including pressure sensitive adhesive on the reverse side of the face material. The face material includes at least one surface layer on at least one side of at least one central layer. The at least one central layer includes cavities that have been initiated at initiation sites by stretching the face material in a longitudinal direction and in a cross direction. The cavities have been expanded in a thickness direction of the face material by allowing a gaseous substance to have an effect on the at least one central layer. Also a method for forming a plastic film for a filmic label.

18 Claims, 2 Drawing Sheets

(56) References Cited

U.S. PATENT DOCUMENTS

| | | | |
|---|---|---|---|
| 4,965,123 A | 10/1990 | Swan et al. | |
| 5,134,173 A * | 7/1992 | Joesten et al. | 521/139 |
| 5,194,324 A * | 3/1993 | Poirier | 428/315.5 |
| 6,183,856 B1 * | 2/2001 | Amon | 428/318.4 |
| 6,638,636 B2 * | 10/2003 | Tucker | 428/515 |
| 6,767,501 B1 * | 7/2004 | Kirjavainen | 264/572 |
| 6,793,854 B1 * | 9/2004 | Kirjavainen | 264/45.9 |
| 2002/0098341 A1 * | 7/2002 | Schiffer et al. | 428/323 |
| 2003/0203156 A1 * | 10/2003 | Hiraishi et al. | 428/131 |
| 2005/0181196 A1 | 8/2005 | Aylward et al. | |
| 2005/0187104 A1 | 8/2005 | Laney et al. | |
| 2006/0024518 A1 * | 2/2006 | Kong et al. | 428/500 |

OTHER PUBLICATIONS

PCT/ISA/210—International Search Report—Nov. 20, 2008.

* cited by examiner

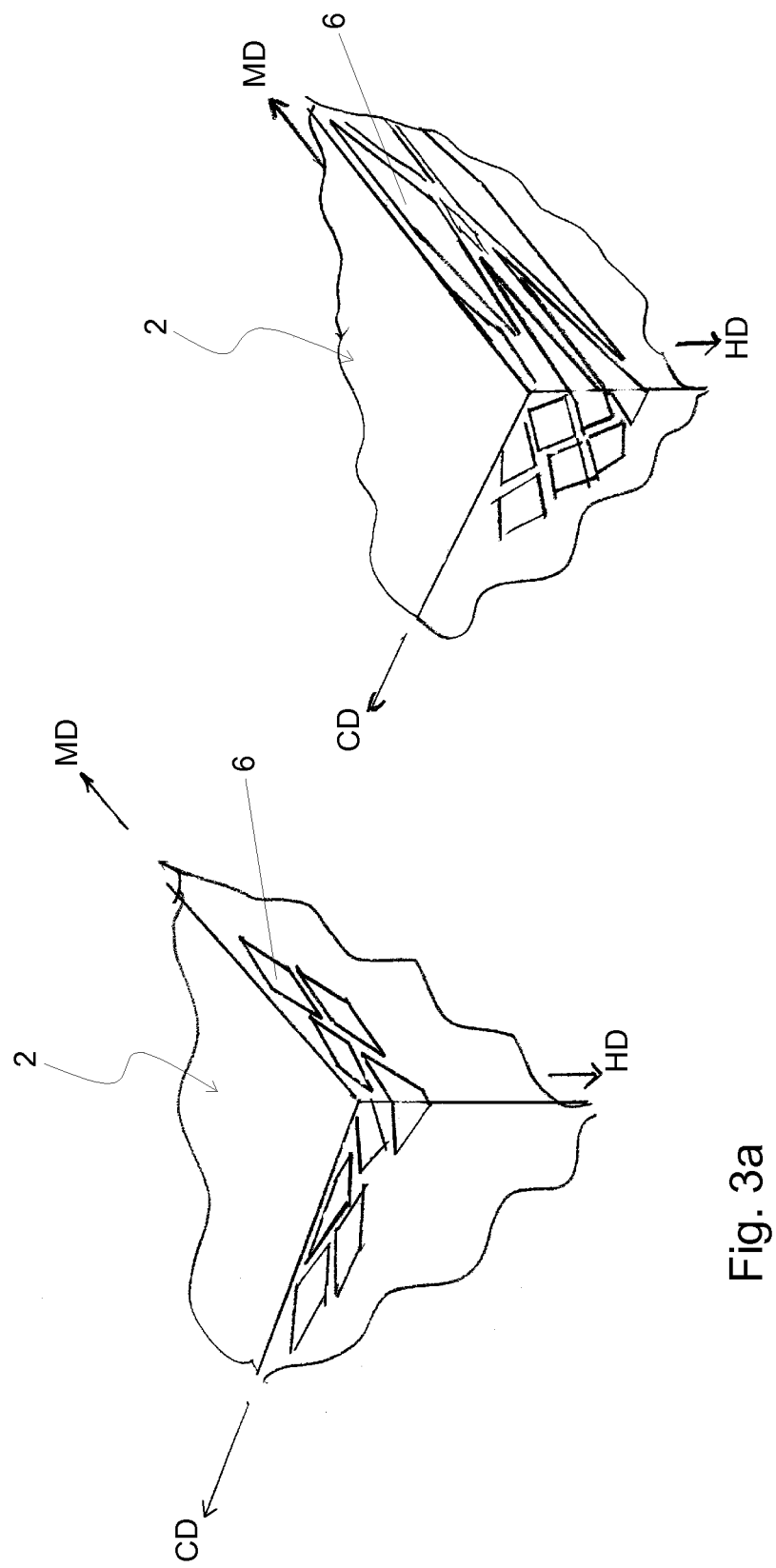

US 8,628,848 B2

PLASTIC FILMIC LABEL AND A USE OF A PLASTIC FILM FOR A FILMIC LABEL

CROSS-REFERENCE TO RELATED APPLICATIONS

This application claims priority to Finnish patent application 20075401 filed Jun. 1, 2007 and is the national phase under 35 U.S.C. §371 of PCT/FI2008/050316 filed Jun. 2, 2008.

FIELD OF THE INVENTION

The present invention relates to a filmic label comprising a face material having a front side, a reverse side and an adhesive layer comprising pressure sensitive adhesive on the reverse side of the face material, the face material comprising at least one surface layer on at least one side of a central layer, the central layer comprising cavities which have been initiated at initiation sites by stretching the face material in the longitudinal direction and in the cross direction. The present invention also relates to a use of a plastic film for a filmic label.

BACKGROUND OF THE INVENTION

The filmic labels have conventionally been labels containing a white mineral filler, such as titanium dioxide ($TiO_2$), in the plastic material. The addition of the white mineral filler has guaranteed good opacity properties and increased print contrast, and thus the label fulfils the criteria of a good printing substrate. The addition of the white mineral filler has, however, caused problems in the label manufacturing process. The white mineral filler is a very hard material and therefore it wears cutting tools during die-cutting operations.

Another option to build a pressure-sensitive filmic label has been disclosed in US 2005/0187104. The publication discloses in its preferred embodiment that a polymer film is co-extruded and stretched in at least one direction. The polymer film comprises a polymeric image-receiving layer and a layer containing polylactic-acid-based material and dispersed inorganic or organic particles or microbeads as void initiators. The void initiators cause the formation of voids in the layer.

The stretching can only be accomplished in the direction of the plane of the film. A drawback related to the above-mentioned polymer film is that the voids tend to flatten irreversibly e.g. when the film is stored in a roll form, or otherwise pressed. This is quite problematic since roll-to-roll operations are typical label manufacturing processes, and also pressing may take place during these processes.

SUMMARY OF THE INVENTION

The filmic label described below provides a solution to the above-mentioned problems. The filmic label is characterized in that the cavities have been expanded in the thickness direction of the face material by allowing a gaseous substance to have an effect on said at least one central layer.

The opacity of the central layer of the face material is inherently good due to the small three-dimensional cavities in the structure of the central layer. In practice, the visible appearance of the central layer is opaque. Therefore, the amount of the white mineral filler in the plastic material can be reduced, or it is not added at all. Although the amount of the white mineral filler is at least reduced, the face material possesses such opacity properties and increased contrast so that it is a good printing substrate. For example, bar codes are easily readable from that printing substrate. Further, the substantially rigid structure of the face material enhances the printing properties of the material.

Due to the cavities and the lower amount of the white mineral filler, the density of the central layer of the face material is low. It may be lower than 500 kg/m$^3$, preferably lower than 300 kg/m$^3$, and more preferably lower than 200 kg/m$^3$. Thus, the face material is inexpensive and ecological because less material is required in order to achieve a proper face material.

In spite of the low density, the strength properties of the face material are good. The three-dimensional cavities make the material stiffer so that in comparison to flat cavities, it possesses better bending resistance. In connection with pressure sensitive adhesives the good bending resistance is an important property because in high speed dispensing of the pressure sensitive labels, the material of the labels must be sufficiently rigid to release the label from the liner. Usually, extra rigidity is required especially in the machine direction.

In addition to the above-mentioned benefits, a sufficiently rigid label is easy to remove cleanly because the central layer does not fracture or delaminate easily. The z-directional orientation (orientation in the thickness direction) makes the material stronger in that direction. It is an important property for the face material that it does not delaminate easily because when a label is removed from its counter surface it is desirable that it is totally separated from that surface, without leaving adhesive or parts of the face material on the counter surface. Thus, it is preferable that the cohesion of the face material and the adhesion of the pressure sensitive adhesive to the face material is stronger than the adhesion of the pressure sensitive adhesive to the counter surface.

To summarize the main benefits of the present face material, a substantially rigid material may be achieved by using less plastic material. Furthermore, as the face material is treated with the gaseous substance, the shape of the cavities and the cell walls are more favorable to resist flattening during the manufacture, or after it. Thus, the properties of the face material are maintained throughout its lifetime.

The face material, which is obtainable from a plastic film possessing the same properties as the face material, may comprise three layers: a first surface layer, a central layer and a second surface layer. The thickness of the face material may be from 30 to 90 µm, preferably from 50 to 70 µm and more preferably from 55 to 65 µm. The layers may be co-extruded at the same time. It is also possible that one or more tie layers are simultaneously extruded between the central layer and the surface layer. The plastic material of the face material may be polyolefin, such as polypropylene, but also other polymeric materials, such as polyester or polylactide, are suitable materials. Admixed with the plastic material there may be material, for example filler material, which can serve as initiation sites from which cavities grow during stretching. The filler material does not stretch when the plastic material is stretched, and consequently, cavities are formed at the filler material particles. In other words, small gas pockets are formed at the filler material particles. The filler may be calcium carbonate ($CaCO_3$) or another suitable initiator. In some cases also a small amount of titanium dioxide ($TiO_2$) may be added in the plastic material to adjust opacity.

The material of the surface layer may be the same as the material of the central layer, but the materials of the surface layer and the central layer may be different from each other. It is also possible that the first surface layer is different from the second surface layer because different properties may be desirable for the first surface layer and the second surface layer. For example, it is important that the first surface layer possesses superior printing properties while the second surface layer must match with the pressure sensitive adhesive. In addition to the material choice, the surface layer to be printed may be coated so that it is easier to print. It generally means that the coating layer increases the surface tension. However, the first surface layer and the second surface layer are often made of the same material and are equal in thickness. It is possible that there is/are a surface layer/layers on one side of the central layer only.

After the face material has been formed, it is stretched both in the longitudinal direction of the face material and in the cross direction of the face material. Initiation sites from which cavities grow during stretching exist in the material of the central layer. The initiation sites may form at particles mixed in the plastic material to be extruded. After longitudinal and cross-directional stretching, the face material is exposed to the orientation in the thickness direction of the face material. A gaseous substance is allowed to have an effect on the central layer of the face material so that the gaseous substance penetrates into the cavities in the central layer, thus expanding the cavities in the thickness direction of the face material. In practice, the gaseous substance is fed into the face material under high pressure so that the gaseous substance diffuses in the cavities and causes overpressure in them at elevated temperatures. The form of the cavities is quite planar after stretching in the longitudinal direction and the cross direction, but after the treatment with the gaseous substance the cavities achieve more spherical shape, depending of course on the rate of expansion to which the face material is exposed. The cavities do not expand randomly but the process is controllable through the process parameters. In addition to what has been said above, the mutual order of the process steps may vary. For example, the cavities may be formed first in the machine direction orientation, the gaseous substance being fed into the cavities at the same time. After that, the orientation in the cross-direction is accomplished.

It is possible to use the same draw ratios in every direction of stretching so that the cavities have equal dimensions in every direction. However, in order to adjust certain properties of the face material, the face material may be stretched so that different draw ratios are used in different directions. The cavities have a dimension in the cross-direction of the face material, a dimension in the thickness direction of the face material and a dimension in the machine direction of the face material. It is preferred that the dimensions in the cross-direction and thickness direction of the face material are substantially equal, and the dimension in the machine direction is longer than the dimension in the cross-direction of the face material, i.e. the cavities are tubular and those tubes extend in the machine direction of the face material. The dimension in the machine direction is more than one time longer than the dimension in the cross-direction of the face material but preferably it is at least two times longer than the dimension in the cross-direction of the face material. However, it is also possible that the dimensions in the machine direction and thickness direction of the face material are substantially equal, and the dimension in the cross direction is longer than the dimension in the machine direction of the face material, i.e. the cavities are tubular and those tubes extend in the cross direction of the face material. The dimension in the cross-direction is more than one time longer than the dimension in the machine direction but preferably it is at least two times longer than the dimension in the machine direction.

In general, the typical draw ratios in the machine direction are from 2 to 15, preferably from 5 to 10; in the cross-direction from 1.5 to 10, preferably from 1.5 to 6; and in the thickness direction from 1.5 to 3.5, preferably from 1.5 to 2.0. All combinations of the draw ratios inside the above-mentioned ranges are possible.

When the dimensions in the cross-direction and thickness direction of the face material are substantially equal, and the dimension in the machine direction is longer than the dimension in the cross-direction of the face material, the bending strength is extremely good in the machine direction and the flexibility is extremely good in the cross-direction. The compression strength (in the thickness direction) is also good compared to those films which are not expanded in the thickness direction.

After all the orientation phases have been accomplished, the face material is heat-treated in order to achieve a dimensionally stable face material, i.e. the relaxation of the internal stresses of the face material must take place.

A pressure sensitive adhesive is applied on a release liner and the face material is attached to the adhesive. Alternatively, a pressure sensitive adhesive is applied directly on the reverse side of the face material. Thus, either a transfer coating process or a direct coating process is used. Labels are die-cut from the face material and a waste matrix web surrounding the labels is removed. The labels remain on the surface of the release liner, such as a release paper whose outer surface has been siliconized.

It is also possible that the face material comprises more than the above-mentioned three layers. The central layer may comprise several superposed layers, all including triaxially oriented structures (x, y and z directions, ie. the layers are oriented in the cross direction, the longitudinal direction and the thickness direction of the face material).

In the following, the invention is described by referring to the drawings in which

BRIEF DESCRIPTION OF THE DRAWINGS

FIGS. 3a and 3b show a schematic (perspective) cross-sectional view of the central layer after the cavities have been expanded in the z-direction.

DETAILED DESCRIPTION OF EMBODIMENTS OF THE INVENTION

Figure 1:
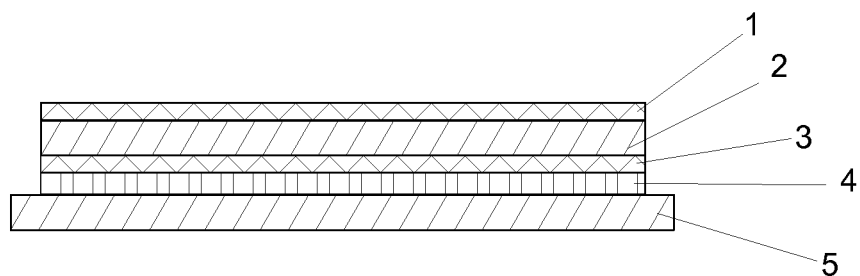
FIG. 1 shows a cross-sectional view of the label on the invention.

FIG. 1 shows a cross-sectional view of the label of the invention. The face material comprises a first surface layer 1, a central layer 2 and a second surface layer 3. The thickness of the face material may be from 30 to 90 μm, preferably from 50 to 70 μm and more preferably from 55 to 65 μm. The layers are usually co-extruded at the same time. After the face material has been formed, it is stretched both in the longitudinal direction of the face material and in the cross direction of the face material. Initiation sites from which cavities grow during stretching exist in the material of the central layer. The initiation sites may form at particles mixed in the plastic material to be extruded. After longitudinal and cross-directional stretching, the face material is exposed to the orientation in the thickness direction of the face material. A gaseous substance is allowed to have an effect on the central layer 2 of the face material so that the gaseous substance penetrates into the cavities in the central layer, thus expanding the cavities in the thickness direction of the face material. The form of the cavities is quite planar after the stretching in the longitudinal direction and the cross direction, but after the treatment with the gaseous substance the cavities achieve a more symmetrical shape, depending of course on the rate of expansion to which the face material is exposed.

The label also comprises an adhesive layer 4 which is preferably a pressure sensitive adhesive layer. A release layer 5 may be provided underneath the adhesive layer 4.

Figure 2:
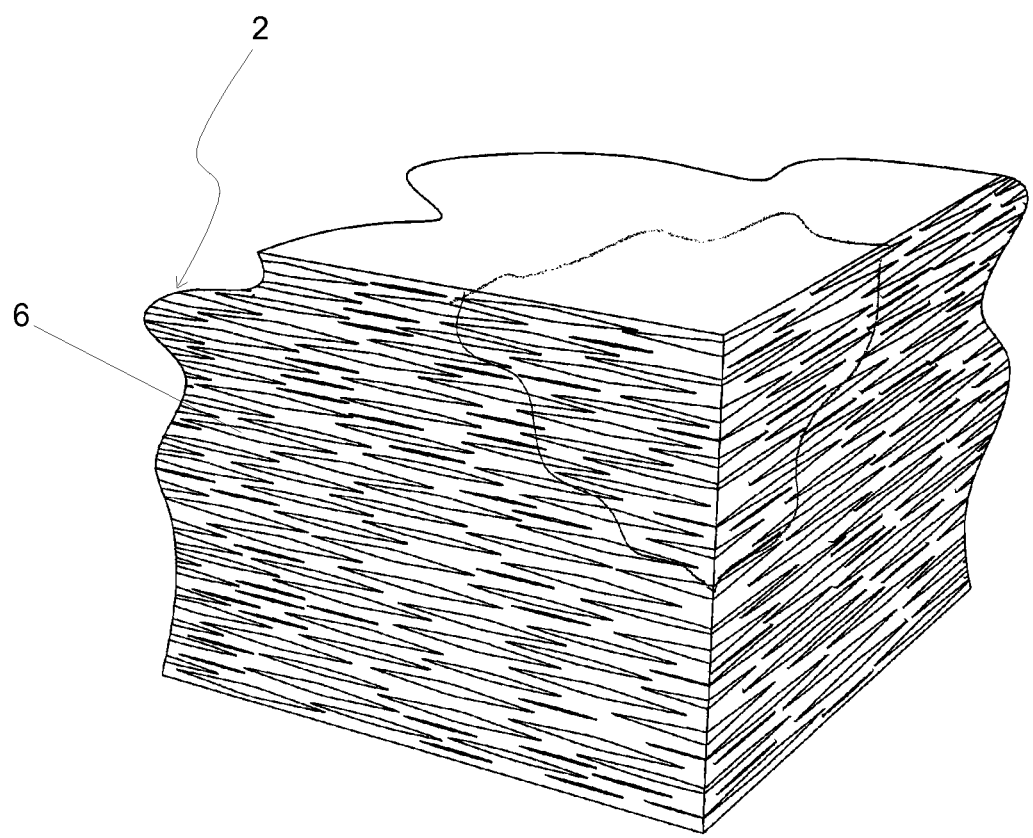
FIG. 2 shows a schematic (perspective) cross-sectional view of the central layer before the cavities have been expanded in the z-direction (the thickness direction)

FIGS. 2 and 3 are schematic illustrations on what happens when the cavities are exposed to the gaseous substance. FIG. 2 shows the cross section of the central layer 2 after it has been oriented in the longitudinal direction (machine direction) and in the cross direction of the web. The draw ratio in the longitudinal direction (MD) is 8, and the draw ratio in the cross direction (TD) is 5. Because the central layer has not been expanded yet, the draw ratio in the thickness direction (HD) is 1. FIGS. 3a and 3b show the cross section of the central layer 2 after the cavities 6 have also been expanded in the thickness direction (HD) of the web. In FIG. 3a the draw ratios are the following: MD 8/TD 5/HD 1.5. In FIG. 3b the draw ratios are the following: MD 8/TD 2/HD 2. In FIG. 2 the cavities 6 are flat, whereas in FIG. 3 the cavities 6 have grown in the thickness direction and the cavities 6 have achieved a more symmetrical shape. Naturally, it is possible to adjust the draw ratios as desired so that optimal properties can be achieved by tailoring the film according to the application requirement.

After all the orientation phases have been accomplished, the face material is heat-treated in order to achieve the product stability of the face material, i.e. the relaxation of the internal stresses of the face material must take place.

A pressure sensitive adhesive is applied on a release liner and the face material is attached to the adhesive, or a pressure sensitive adhesive is applied directly on the reverse side of the face material. Labels are die-cut from the face material and a waste matrix web surrounding the labels is removed. The labels remain on the surface of the release liner, such as a release paper whose outer surface has been siliconized.

The invention claimed is:

1. A filmic label, comprising:
a face material having a front side, a reverse side and an adhesive layer comprising pressure sensitive adhesive on the reverse side of the face material, the face material comprising at least one surface layer on at least one side of at least one central layer, said at least one surface layer and said at least one central layer are simultaneously coextruded, and said at least one central layer comprising cavities which have been initiated at initiation sites comprising particles by stretching the face material in a longitudinal direction and in a cross direction, wherein the cavities have been expanded in a thickness direction of the face material by allowing a gaseous substance to have an effect on said at least one central layer, and wherein a density of the central layer of the face material is lower than 500 kg/m$^3$, and wherein the cavities have a dimension in the cross-direction of the face material, a dimension in the thickness direction of the face material and a dimension in a machine direction of the face material, all said dimensions being substantially equal.

2. The filmic label according to claim 1, wherein the face material comprises polyolefin, polyester or polylactide.

3. The filmic label according to claim 1, wherein the density of the central layer of the face material is lower than 200 kg/m$^3$.

4. A filmic label, comprising:
a face material having a front side, a reverse side and an adhesive layer comprising pressure sensitive adhesive on the reverse side of the face material, the face material comprising at least one surface layer on at least one side of at least one central layer, said at least one surface layer and said at least one central layer are simultaneously coextruded, and said at least one central layer comprising cavities which have been initiated at initiation sites comprising particles by stretching the face material in a longitudinal direction and in a cross direction, wherein the cavities have been expanded in a thickness direction of the face material by allowing a gaseous substance to have an effect on said at least one central layer, and wherein a density of the central layer of the face material is lower than 500 kg/m$^3$, and wherein the cavities have a dimension in the cross-direction of the face material, a dimension in the thickness direction of the face material and a dimension in a machine direction of the face material, the dimensions in the cross-direction and thickness direction of the face material being substantially equal, and the dimension in the machine direction being longer than the dimension in the cross-direction of the face material.

5. The filmic label according to claim 4, wherein the face material comprises polyolefin, polyester or polylactide.

6. The filmic label according to claim 4, wherein the density of the central layer of the face material is lower than 200 kg/m$^3$.

7. A filmic label, comprising:
a face material having a front side, a reverse side and an adhesive layer comprising pressure sensitive adhesive on the reverse side of the face material, the face material comprising at least one surface layer on at least one side of at least one central layer, said at least one surface layer and said at least one central layer are simultaneously coextruded, and said at least one central layer comprising cavities which have been initiated at initiation sites comprising particles by stretching the face material in a longitudinal direction and in a cross direction, wherein the cavities have been expanded in a thickness direction of the face material by allowing a gaseous substance to have an effect on said at least one central layer, and wherein a density of the central layer of the face material is lower than 500 kg/m$^3$, and wherein the cavities have a dimension in the cross-direction of the face material, a dimension in the thickness direction of the face material and a dimension in a machine direction of the face material, the dimensions in the machine direction and thickness direction of the face material being substantially equal, and the dimension in the cross-direction being longer than the dimension in the machine direction of the face material.

8. The filmic label according to claim 7, wherein the face material comprises polyolefin, polyester or polylactide.

9. The filmic label according to claim 7, wherein the density of the central layer of the face material is lower than 200 kg/m$^3$.

10. A method for forming a plastic film for a face material of a filmic label, wherein the face material has a front side and a reverse side, the method comprising:
providing the plastic film comprising at least one surface layer on at least one side of at least one central layer, wherein the at least one surface layer and the at least one central layer are simultaneously coextruded,
initiating at initiation sites comprising particles cavities in said at least one central layer by stretching the plastic film in a longitudinal direction and in a cross direction,
expanding the cavities in a thickness direction of the plastic film by allowing a gaseous substance to have an effect on said at least one central layer, such that a density of the central layer of the face material is lower than 500 kg/m³, wherein the cavities have a dimension in the cross-direction of the face material, a dimension in the thickness direction of the face material and a dimension in a machine direction of the face material, all said dimensions being substantially equal, and applying an adhesive layer comprising pressure sensitive adhesive to the reverse side of the face material.

11. The method according to claim 10, wherein the face material comprises polyolefin, polyester or polylactide.

12. The method according to claim 10, wherein the density of the central layer of the face material is lower than 200 kg/m³.

13. A method for forming a plastic film for a face material of a filmic label, wherein the face material has a front side and a reverse side, the method comprising:

providing the plastic film comprising at least one surface layer on at least one side of at least one central layer, wherein the at least one surface layer and the at least one central layer are simultaneously coextruded, initiating at initiation sites comprising particles cavities in said at least one central layer by stretching the plastic film in a longitudinal direction and in a cross direction, expanding the cavities in a thickness direction of the plastic film by allowing a gaseous substance to have an effect on said at least one central layer, such that a density of the central layer of the face material is lower than 500 kg/m³, wherein the cavities have a dimension in the cross-direction of the face material, a dimension in the thickness direction of the face material and a dimension in a machine direction of the face material, the dimensions in the cross-direction and thickness direction of the face material being substantially equal, and the dimension in the machine direction being longer than the dimension in the cross-direction of the face material, and applying an adhesive layer comprising pressure sensitive adhesive to the reverse side of the face material.

14. The method according to claim 13, wherein the face material comprises polyolefin, polyester or polylactide.

15. The method according to claim 13, wherein the density of the central layer of the face material is lower than 200 kg/m³.

16. A method for forming a plastic film for a face material of a filmic label, wherein the face material has a front side and a reverse side, the method comprising:

providing the plastic film comprising at least one surface layer on at least one side of at least one central layer, wherein the at least one surface layer and the at least one central layer are simultaneously coextruded, initiating at initiation sites comprising particles cavities in said at least one central layer by stretching the plastic film in a longitudinal direction and in a cross direction, expanding the cavities in a thickness direction of the plastic film by allowing a gaseous substance to have an effect on said at least one central layer, such that a density of the central layer of the face material is lower than 500 kg/m³, wherein the cavities have a dimension in the cross-direction of the face material, a dimension in the thickness direction of the face material and a dimension in a machine direction of the face material, the dimensions in the machine direction and thickness direction of the face material being substantially equal, and the dimension in the cross-direction being longer than the dimension in the machine direction of the face material, and applying an adhesive layer comprising pressure sensitive adhesive to the reverse side of the face material.

17. The method according to claim 16, wherein the face material comprises polyolefin, polyester or polylactide.

18. The method according to claim 16, wherein the density of the central layer of the face material is lower than 200 kg/m³.

* * * * *

UNITED STATES PATENT AND TRADEMARK OFFICE
CERTIFICATE OF CORRECTION

PATENT NO.       : 8,628,848 B2
APPLICATION NO.  : 12/602594
DATED            : January 14, 2014
INVENTOR(S)      : Saxen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1013 days.

Signed and Sealed this
Thirtieth Day of May, 2017

Michelle K. Lee
*Director of the United States Patent and Trademark Office*